Patented July 29, 1924.

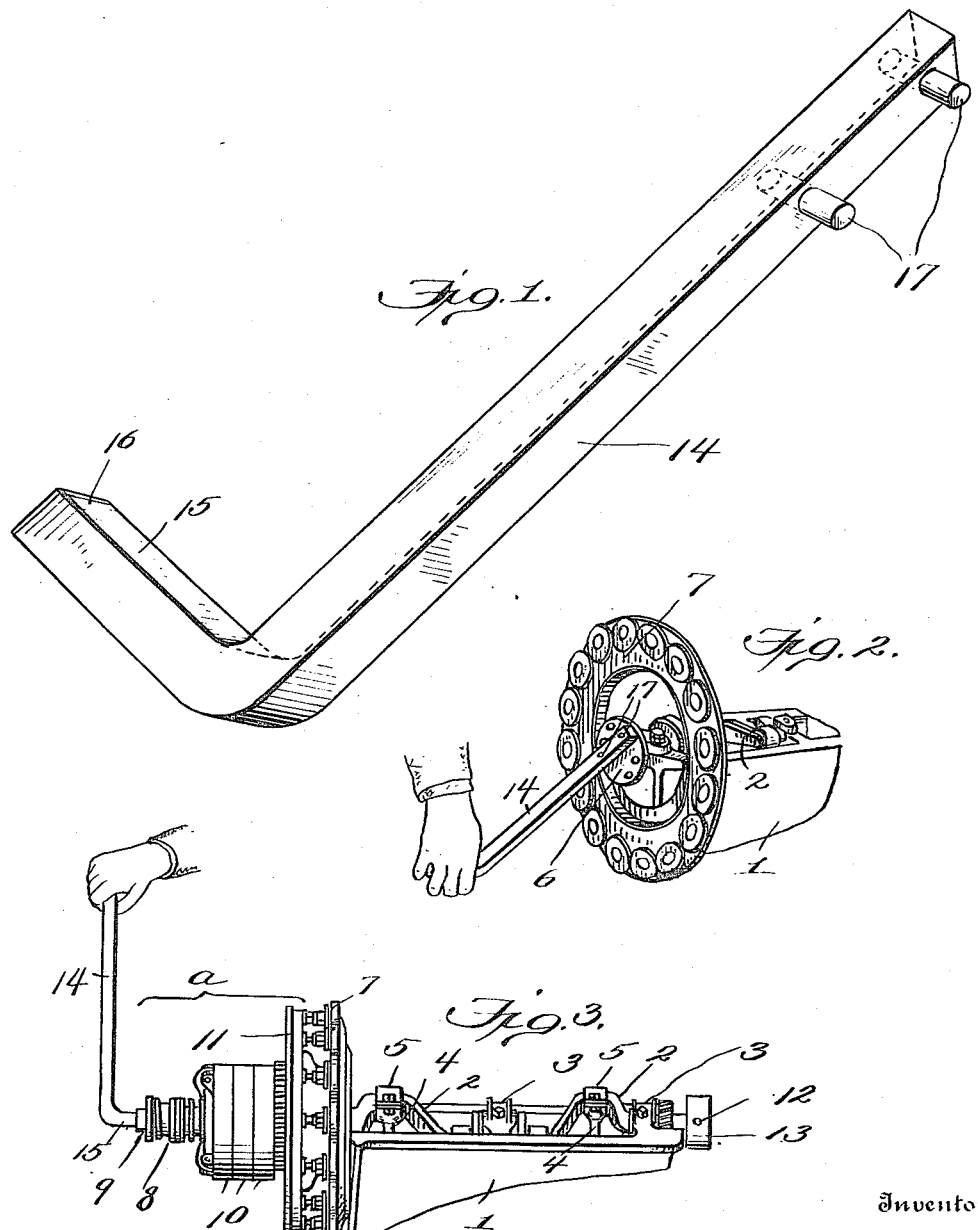

UNITED STATES PATENT OFFICE.

JOHN ALLEN CLAY, OF MIAMI, FLORIDA, ASSIGNOR OF ONE-HALF TO ROBERT H. HULL, OF MIAMI, FLORIDA.

AUTOMOBILE WRENCH.

Application filed May 31, 1923. Serial No. 642,634.

*To all whom it may concern:*

Be it known that I, JOHN ALLEN CLAY, a citizen of the United States, residing at Miami, in the county of Dade and State of Florida, have invented new and useful Improvements in Automobile Wrenches, of which the following is a specification.

This invention relates to wrenches and proposes the construction of a device of that character which finds its chief, although not necessarily exclusive, utility as a tool for rotating the crank shaft of an engine to facilitate the performance of repair or overhaul work upon said engine.

In the specific form disclosed in the drawings, the wrench forming the subject matter of the invention is designed for use in the power plant of the Ford automobile, although it is within the scope of the invention to change or modify the construction of the wrench sufficiently to adapt it for similar service in rotating the crank shafts of engines of other types.

In the drawings:—

Figure 1 is a perspective view of my improved automobile wrench.

Figure 2 is a perspective view of a portion of the Ford engine showing the crank shaft with the fly-wheel and transmission assembly removed.

Figure 3 is a side elevation of the Ford engine, parts being broken away, showing the wrench applied to the end of the transmission assembly.

Referring now in detail to the several figures, and first particularly to Figures 2 and 3, the numeral 1 represents a portion of the cylinder block of an internal combustion engine which has been removed from the automobile and placed in an inverted position for convenience in working upon it. The crank shaft 2 is journalled in main bearings carried by the cylinder block, said crank shaft being held in place by bearing caps 3 which are securely bolted to said cylinder block. Connecting rods 4 are attached to the crank shaft by means of the connecting rod caps 5 which are bolted to the lower ends of the connecting rods, cooperating therewith to form annular bearings around said crank shaft. The rear or inner end of the crank shaft is provided with a flange 6, which in the type of engine under description lies substantially in the plane of the magneto coil ring 7. A transmission assembly, which is designated as a whole by the letter *a* in Figure 3 is removably secured to the flange 6 by means of bolts passing through said flange from the obverse side to that shown in Figure 2, and into the element of a transmission assembly. Said transmission assembly comprises the clutch spring 8 and its associated parts, including a stub shaft 9 having a polygonal socket adapted to receive the polygonal coupling member of a universal joint, not shown, which lies at the head of the drive shaft of the automobile. The transmission assembly also includes the band drums 10 which enclose part of the transmission gearing, and a fly-wheel 11, the latter carrying the bolts by which the transmission assembly is secured to the flange 6 of the crank shaft.

The operations in which my wrench is intended to be most frequently called into use are the fitting of the main bearings of the crank shaft and the fitting of the connecting rod caps. Each of these operations requires that the crank shaft be rotated, both to render various bolts accessible and in testing the tightness of the bearings. It may be here stated that the parts are, as a rule, far too stiff to permit of the crank shaft being turned by hand. Mechanics have heretofore had recourse to the regular hand crank for turning said crank shaft, applying said crank to the pin 12 which passes through the hollow fan belt pulley 13 on the front or forward end of the crank shaft. But the dog on the hand crank permits turning of the crank shaft in but one direction, necessitating a complete rotation of the crank shaft, should the latter be inadvertently moved ever so slight a distance beyond the desired point. The present invention is so designed as to permit turning of the crank shaft in either direction, to any degree desired and is so constructed as to remain in engagement with said crank shaft or its allied parts until purposely removed, whereas the hand crank of the engine will drop off as soon as it is released by the hand of the operator.

In fitting the main bearings it is customary to strip the crank shaft of all excess weight. Therefore it is the usual practice to remove the transmission assembly as a whole. This is done by taking out the bolts which connect the fly-wheel 11 to the flange 6, the head of said bolts being reached, as hereinbefore stated, from the obverse or front side of the flange 6. In order to rotate the fly-wheel so as to render said bolts successively accessible, my improved wrench, the handle of which consists of a rigid bar 14, is provided with an angular portion 15 having a polygonal end 16 of such shape and size as to neatly fit within the polygonal socket at the end of the stub shaft. When the wrench is inserted in said socket as shown in Figure 3, the bar 14, which in such case forms the handle thereof may be turned in either direction to rotate the flywheel and to bring the bolts successively into position where they can be reached. The transmission assembly having been removed, the crank shaft may be rotated while fitting the main bearings by engagement of pins 17, which are carried in relatively spaced relation by the bar 14 adjacent the opposite end of the latter, with diametrically opposite bolt holes of the flange 6. In the latter case the angular portion 15 serves as a crank handle.

The position of engagement of the wrench with the engine, shown in Figure 3 is that which is assumed when the degree of tightness of the connecting rod caps is being tested and when it is desired to have ready access to the bolts which secure said caps in place, it being unnecessary in this case to remove the transmission assembly.

While it is old to provide a two ended wrench, of which each end is designed for specific engagement with diverse objects of mechanism, it is new to provide a wrench of the character herein-described, the ends of which are designed for specific application, respectively, to the end and intermediate portions of a divisible crank shaft. It is to be understood that the invention is not limited to the precise details of construction and arrangement shown, but that various changes may be made in the form and relation of parts to suit different requirements of analogous use.

Having described my invention, what I claim as new and desire to secure by Letters Patent, is:—

A combined spanner wrench and hand crank adapted for specific use in rotating a crank shaft which has a flange provided with bolt holes, to which flange a removable portion is bolted, and which flange has a polygonal socket in its outer end, both before and after removal of said removable portion, said wrench comprising a handle having a plurality of spaced pins extending laterally in the same direction adjacent one end thereof for engagement with a pair of said bolt holes, and the other end of said handle being bent angularly in the opposite direction from said pins and being polygonal shaped at its bent extremity for engaging said socket, said angularly bent end being also adapted to act as a crank when said pins are in engagement with a pair of said bolt holes for turning the flanged portion of said crank shaft.

In testimony whereof I have hereunto set my hand.

JOHN ALLEN CLAY.